INVENTOR.
Wayne B. Lyon
David Ehlert
BY Michael Kovac
Their Att'y

Dec. 12, 1967  W. B. LYON ET AL  3,357,053
APPARATUS FOR CURLING RIMS OF ARTICLES
Filed Aug. 27, 1964  4 Sheets-Sheet 3
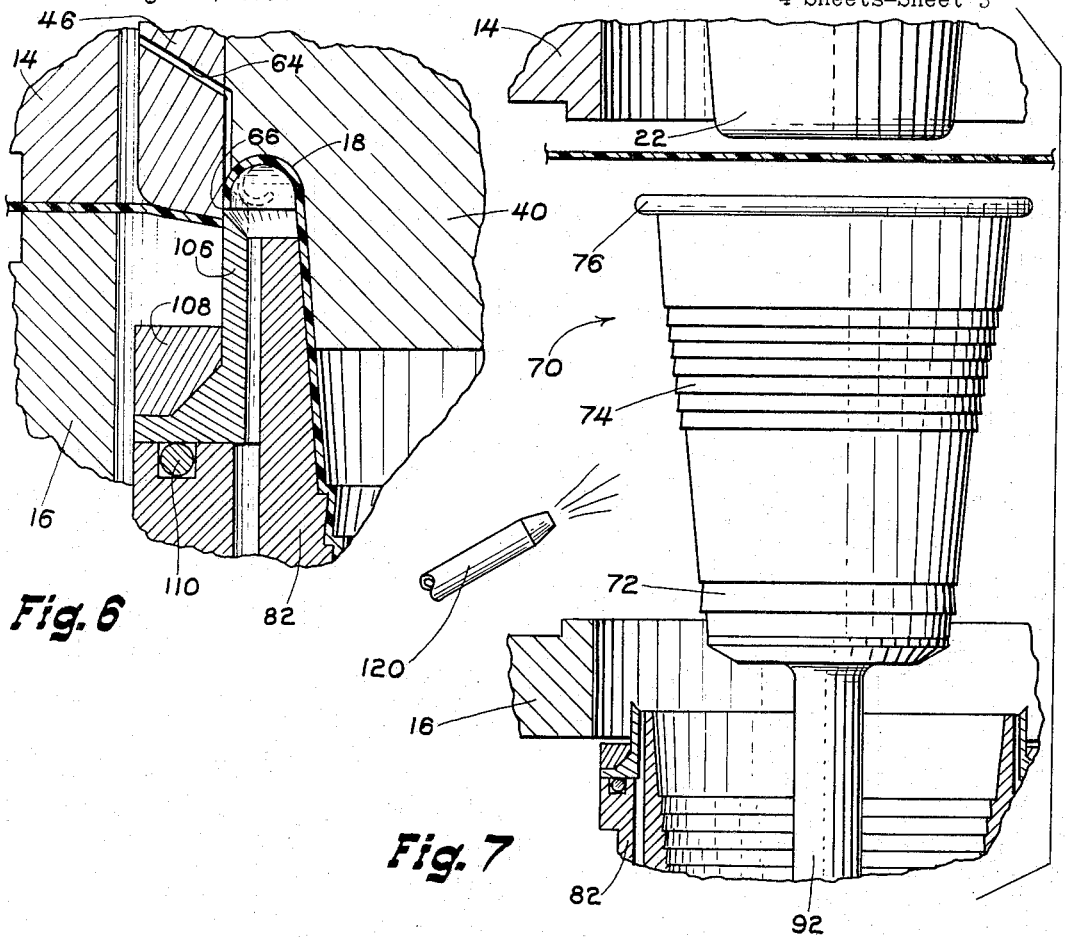
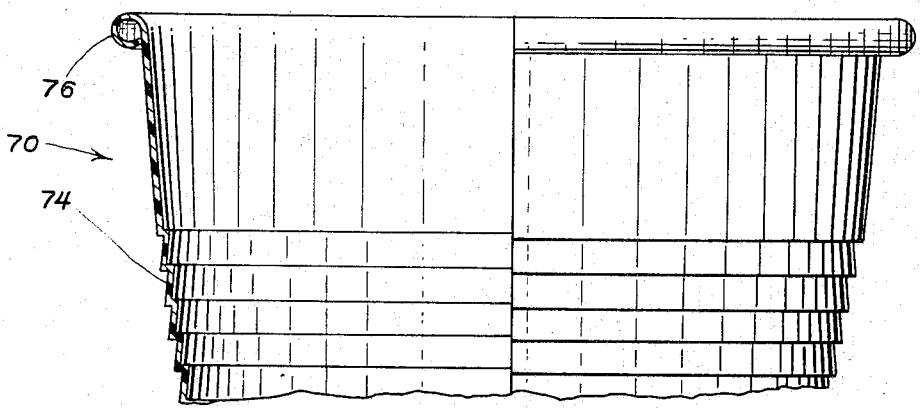
INVENTOR.
Wayne B. Lyon
David Ehlert
BY
Michael Kovac
Their Att'y

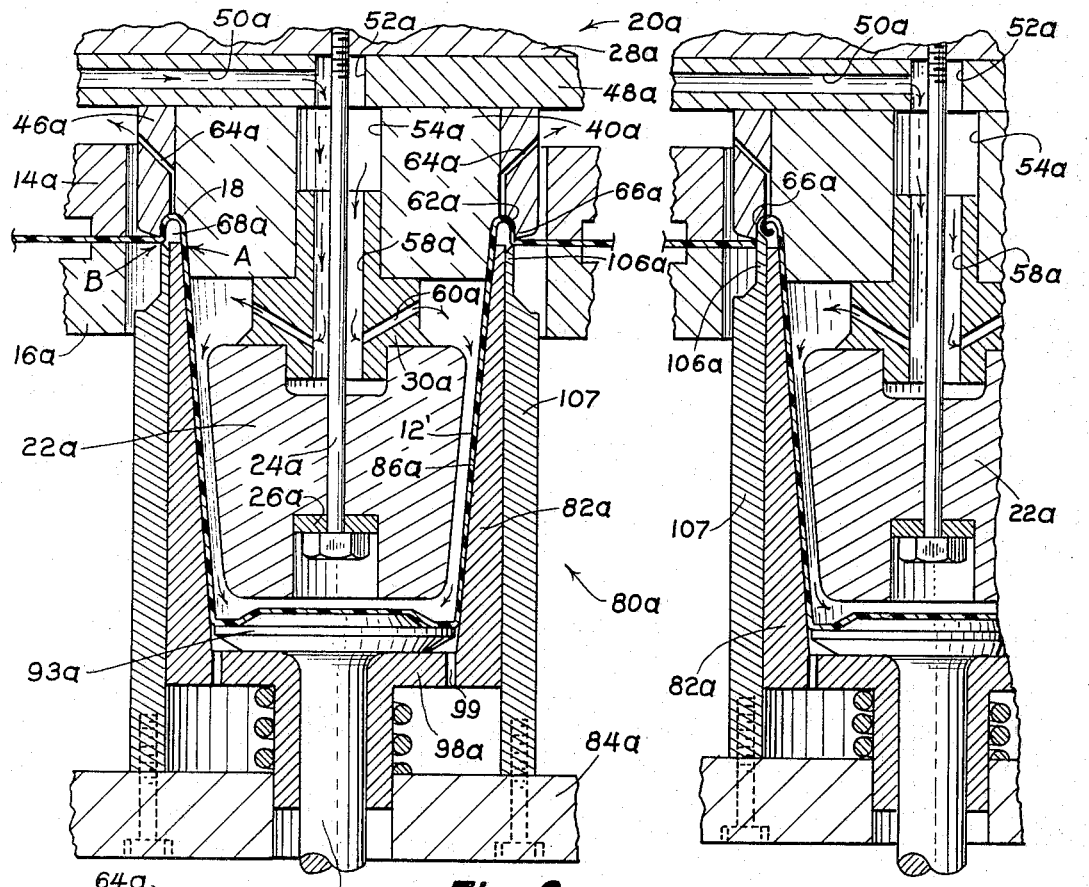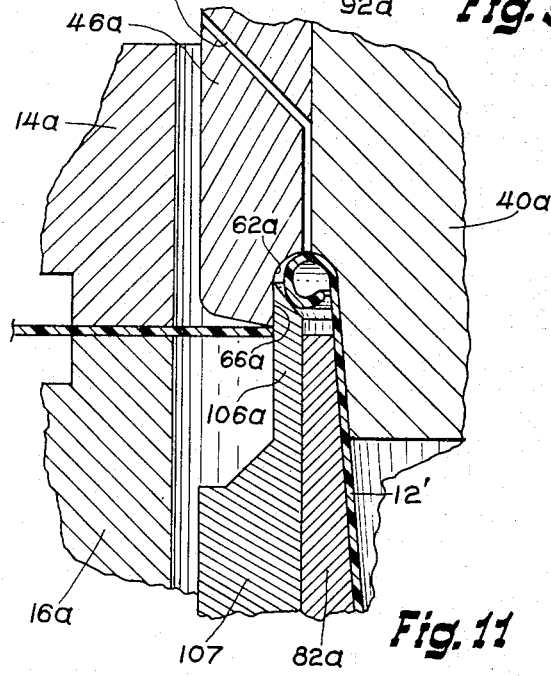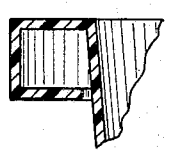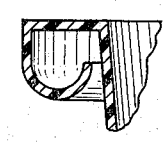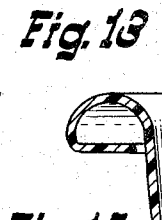
INVENTOR.
Wayne B. Lyon
David Ehlert

United States Patent Office 3,357,053
Patented Dec. 12, 1967

3,357,053
APPARATUS FOR CURLING RIMS OF ARTICLES
Wayne B. Lyon, Deerfield, and David Ehlert, Lake Zurich, Ill., assignors to Illinois Tool Works Inc., Chicago, Ill., a corporation of Delaware
Filed Aug. 27, 1964, Ser. No. 392,409
3 Claims. (Cl. 18—19)

ABSTRACT OF THE DISCLOSURE

An apparatus for thermoforming hollow thermoplastic articles such as containers with a rolled or curled lip portion in a single forming station, positive fluid pressure being utilized to expand a partially drawn container against a female mold member with the air trapped between the predrawn container and the female mold being collected and utilized in forming the rolled or curled lip portion to a predetermined configuration for subsequent rim forming engagement thereof.

---

Prior art techniques for forming containers are quite numerous, but are based principally on two methods, one being the technique of injection molding, and the other related to the thermoforming art. Whichever of these methods is employed, there is a possibility that ragged or sharp edges will be produced at the open mouth of an article, and this is obviously undesirable from both the manufacturer's and consumer's view point. This is especially the case where thermoforming methods are employed to shape articles or containers from a web of thermoplastic material, the articles then being severed from the web either at the molding station or at a subsequent trimming station. As a result, it is presently the practice with certain manufacturers to provide additional apparatus for rolling or curling the rim of the article or container to a desired configuration.

Separate rim curling apparatus creates article handling and feeding problems, as well as increases the cost and time required to manufacture the articles. In attempting to overcome these difficulties, several proposals have been advanced centering around the concept of curling the rim of the article or container while it is still positioned within the molding apparatus. Some of the techniques are based upon either a mechanical curling operation or the use of fluid pressure to achieve the desired rim configuration, and at least one prior art approach has suggested combining the mechanical engaging and fluid pressure techniques. While these approaches are advantageous and are basically sound, they have not been entirely successful in forming a good material definition in the rim area of the containers.

Accordingly, it is an object of the present invention to overcome the above noted disadvantages, and improve the material definition in the rim area of a container or the like.

It is another object of the present invention to provide an apparatus for forming a disposable container having a finished drinking surface.

Another object of the present invention is the provision of an apparatus for forming a thin-walled article or container with a rolled or curled lip in a single operation, and with an improved definition of the material in the lip or rim area of the container.

A further object of the present invention is the provision of an apparatus for forming a drinking lip on a thin-walled container at a relatively low cost by the elimination of secondary forming operations, as well as the simplification of handling and packaging operations.

Still another object of the present invention is the provision of a novel apparatus for forming a hollow article such as a thin-walled container with a rolled or curled lip in a rapid and efficient manner, and without extensive modifications of existing equipment.

A still further object of the present invention includes the provision of a novel apparatus for forming a finished drinking surface on a thin-walled container in a repetitive and automatic manner, and in substantially the same amount of time which is presently needed to form merely the container alone.

Other and further objects and advantages will become apparent from the following description when taken in conjunction with the accompanying drawings wherein:

FIG. 6 is an enlarged fragmentary sectional view of that portion of the apparatus used to form the thickened rim portion on the container;

FIG. 7 is a fragmentary front elevational view, partly in section, of the completed article just prior to its removal from the apparatus;

FIG. 8 is an enlarged front elevational view, partly in section, of the container having the thickened rim portion formed thereon in accordance with the principles of the present invention;

FIG. 9 is a fragmentary sectional view of another embodiment relating to the present invention, and showing the formation of the rim or lip area during the molding cycle;

FIG. 10 is a fragmentary sectional view similar to FIG. 9, and illustrating the severance of the container from the web and the subsequent curling of the lip or rim portion;

FIG. 11 is an enlarged fragmentary sectional view of that portion of the apparatus relating to the second embodiment which forms the lip or rim area of the container; and FIGS. 12–13 are enlarged fragmentary sectional views of various rim configurations which can be formed in accordance with the teachings of the present invention.

Figure 1:
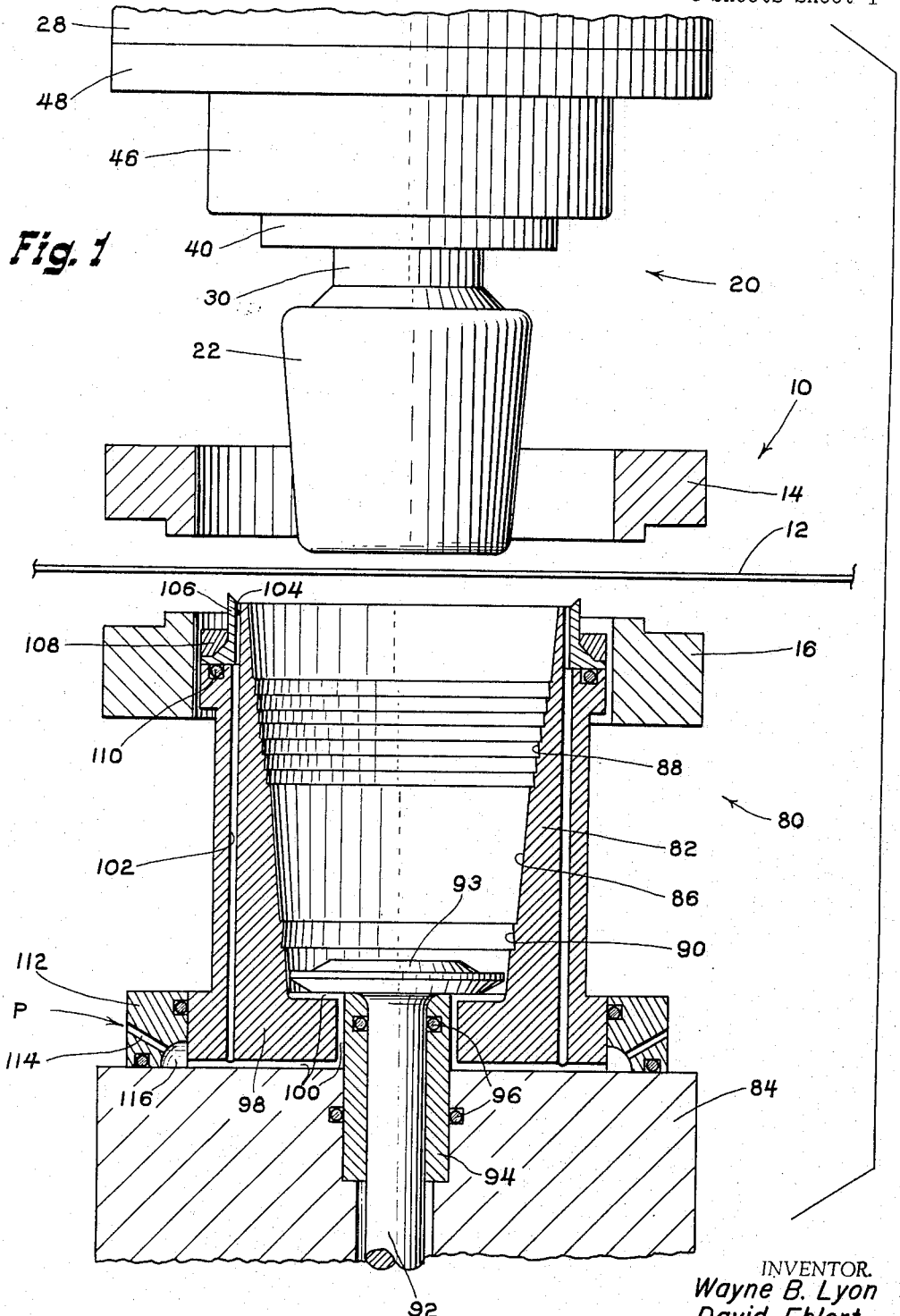
FIG. 1 is a front elevational view, partly in section, of the apparatus used to form an article container with a thickened rim portion in a single operation.

Referring now in greater detail to the drawings, and in particular to the form of the invention shown in FIGS. 1–5 of the drawings, there is disclosed an apparatus or forming station 10 for molding hollow articles such as containers and the like from a web 12 of heated thermoplastic material. The web 12 is carried along a horizontal path by suitable conveyor means such as opposed drive belts, feed rollers, etc. (not shown), and is intermittently advanced passed a heating station where an electric resistance heater or the like is located for heating the plastic material to the forming temperature. The web is then advanced to the forming station 10 having one or more upper and lower mold means 20, 80 respectively Prior to the relative shifting of the upper and lower mold means toward each other, the heated web 12 of thermoplastic material is clamped by upper and lower clamp means 14, 16 intermediate of and out of contact with the cooperating upper and lower mold means so as to prevent premature localized cooling in the area of the sheet to be drawn, as well as facilitate the formation of the containers. The upper and lower clamping rings 14, 16 are shown only diagrammatically here, but may be of the type shown and described in U.S. Patent No. 2,962,758 dated Dec. 6, 1962, to Charles J. Politis. Once the web 12 has been clamped in position by the upper and lower clamp rings 14, 16, the upper and lower mold means 20, 80 respectively can then be advanced toward each other for the actual molding of the containers.

Figure 2:
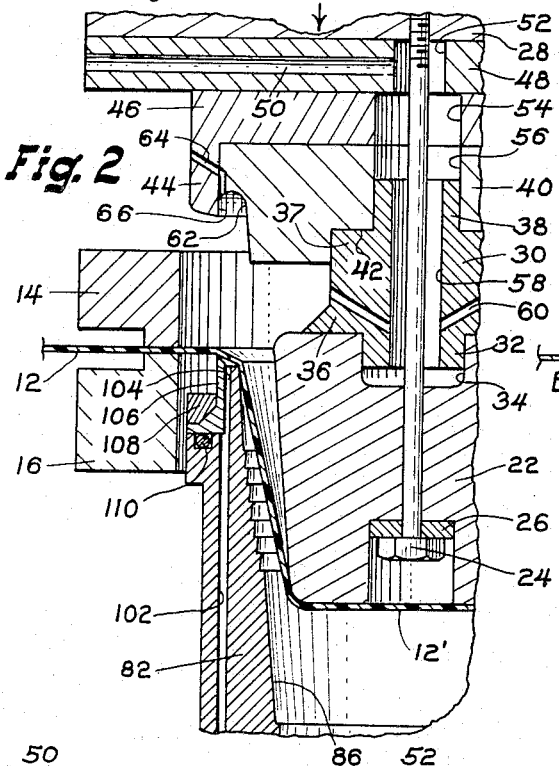
FIG. 2 is a fragmentary sectional view of the apparatus in FIG. 1, and showing the upper mold means thereof as it moves into engagement with the web of thermoplastic material and draws it into the lower mold means.

The upper mold means 20 as generally seen in FIG. 1 and as specifically shown in FIG. 2 of the drawings, is provided with a mandrel or plug member 22 which is used for initially pre-stretching the sheet as is well known in the art, and which will be explained in further detail below. A bolt or fastener element 24 passes through a washer 26 positioned within a recess formed in the bottom portion of the mandrel 22 and through the mandrel to secure it to the upper platen 28. An adapter 30 located above the mandrel 22 also receives the bolt 24, and is provided with an annular depending element 32 which is positioned in snug fitting relationship within the opening 34 in the upper body portion of the mandrel 22. Spaced upwardly from the annular depending element 32 is a radially extending flange 36 which overlies and rests upon the upper surface of the mandrel to impart stability to the adapter 30. At the opposite end of the adapter 30, there is provided an annular boss element 38 which is received within the opening of die block portion 40 to impart stability to the adapter as well as resist lateral movement thereof. An internal area of the block 40 is recessed at 42 to receive a complementary shaped portion 37 of the adapter.

A longitudinally extending circular flange 44 of the second die block 46 surrounds the first die block 40 with the interfaces of the die blocks in complementary association. Intermediate the upper or second die block 46 and the upper platen 28 is an air manifold plate 48 having an air passageway 50 which cooperates with the recesses or channels 52, 54, 56 and 58 formed in the air manifold plate 48, upper die block 46, lower die block 40 and adapter 30 respectively, so as to permit air or other fluid pressure to be introduced or withdrawn through the ports 60 in the adapter 30. The various parts of the upper mold means 20 may be made integral with each other if desired; however, it has been found that for manufacturing and assembly purposes, the upper mold means should be made substantially in the form as shown in the drawings.

The upper and lower die blocks 46, 40 respectively, cooperate together to provide the substantially semi-cylindrically shaped downwardly facing recess 62 which is useful in the formation of the rim or lip of the container as will subsequently appear. An exhaust port 64 connects the recess 62 with the area surrounding the upper die block 46 for reasons which will also subsequently appear. A cutting edge 66 is formed on the upper die block 46 adjacent the recess 62 and cooperates with a cutting edge associated with the lower mold means, which will be subsequently identified, to sever the container from the web.

As best seen in FIG. 1, the lower mold means 80 is in the form of a female mold 82 which is supported on the lower platen 84. The female mold 82 has a cavity 86 of a size slightly larger than that of the mandrel 22. The stepped circumferentially extending shoulders 88, 90 provided on the inner periphery of the female mold 82 are useful in forming gripping and stacking areas on a disposable drinking cup such as shown in U.S. Patent No. 3,091,360 dated May 28, 1963, to Bryant Edwards.

An ejector or knock out plug 92 extends through the bottom portion 98 of the mandrel, and is journalled in the sleeve bearing 94 mounted in the lower platen. A pair of O-rings 96 are captured within openings formed in the bearing and lower platen to prevent the entry as well as exit of air in the vicinity of the ejector. The head 93 of the ejector or knock out plug 92 as well as the sleeve bearing 94, and the lower platen 84 are spaced from the bottom portion 98 of the mandrel so as to provide a channel 100 which is connected with the cavity of the female mold. A channel or passageway 102 extends substantially parallel to the axis of the female mold and communicates with the channel 100 and the restricted orifice 104 to allow air to be directed from within the cavity 86, and through the channel 100, passageway 102 and orifice 104 to the surrounding atmosphere.

A cutting ring 106 is held in place on the upper body section of the female mold by the locking member 108. An O-ring 110 is received within a suitable recess adjacent the lower face of the cutting ring 106, and prevents air from entering or exiting at this point. Surrounding the lower body section of the female mold is an air control member 112 having a channel 114 and an air collector 116 through which a constant fluid pressure is introduced to maintain a substantially uniform back pressure P for reasons which will subsequently appear.

Figure 3:
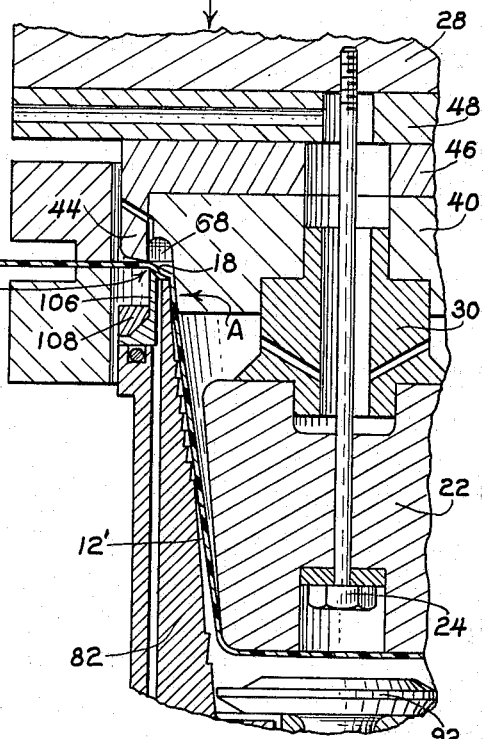
FIG. 3 is a view similar to FIG. 2, and illustrates the further advancement of the upper mold means against the material and within the lower mold means.

As has previously been noted, the upper and lower clamp rings 14, 16 clamp the heated web 12 of thermoplastic material prior to the relative shifting movement of the upper and lower mold means 20, 80. Thereafter, the mandrel 22 and the female mold 82 are relatively shifted toward one another by any suitable means such as, for example, cam mechanisms, hydraulic mechanisms, etc., to cause engagement of the mandrel with the thermoplastic web for drawing predetermined areas 12' as shown in FIG. 2 from the remainder of the sheet and into the cavity 86 of the female mold. Further advance of the mold means toward each other enlarges the predetermined drawn areas 12' as shown in FIG. 3 of the drawings. The mold members are shifted toward one another until the lower die block 40 comes into contact with a portion of the predetermined drawn areas 12' to pinch the same against the internal peripheral wall of the female mold 82, and provide a pinch seal as indicated by letter A, the longitudinally extending flange 44 of the upper die block 46 engages the web 12 and clamps it against the outer peripheral wall of the cutting ring 106 at point B to provide a sealed chamber 68.

Figure 4:
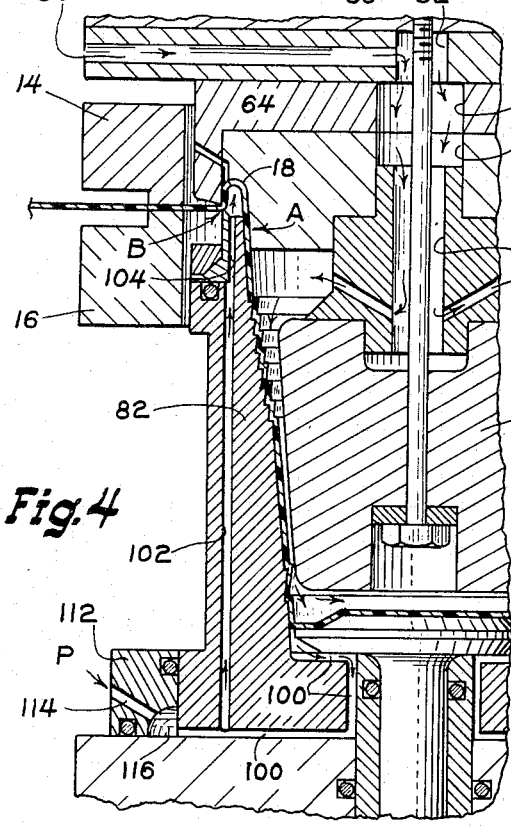
FIG. 4 is a fragmentary sectional view similar to FIGS. 2–3, but illustrating the beginning of the rim formation during the molding cycle.

Air is then immediately introduced within the passageway 50 by any suitable means, and directed through the channels 52, 54, 56 and 58, and thence outwardly through the ports 60 during the next step of the molding cycle, as seen in FIG. 4, to expand the predetermined drawn areas 12' against the inner periphery of the female mold and provide a partially formed container. The air trapped between the predetermined drawn areas 12' and the female mold will then be forced through the channels 100, and up through the passageway 102 and restricted orifice 104 to the sealed chamber 68 and cause the outer marginal portion 18 of the partially formed container to be expanded against the recess 62, the air within the chamber 68 being vented or exhausted by way of the exhaust port 64.

The outer marginal portion 18 of the substantially vertically extending side wall on the partially formed container will thus assume a predetermined attitude or cross sectional configuration relative to the side wall by the application of the differential fluid pressure on opposite sides thereof within the sealed chamber area 68. The air pressure through the adapter 30 is preferably on the order of 90–100 lbs. per square inch, the surge through the channel 100, passageway 102 and restricted orifice 104 for entry within the sealed chamber being slightly smaller than this amount, and generally on the order of 75–90 lbs. per square inch. The introduction of this relatively high pressure surge within the sealed chamber 68 is an important aspect of the present invention since it will provide a good material definition in the rim or lip area which will facilitate the subsequent curling or rolling thereof. In addition, rather complex cross sectional configurations, such as shown in FIGS. 12–15, can be formed without any difficulty.

The amount of air introduced within the sealed chamber 68 can be regulated by varying the amount of air introduced through the adapter 30, but is preferably controlled by air control member 112. This member permits a constant back pressure P to be directed through the port 114 thereof and into the collector chamber 116, the pressure being less than the air pressure surge coming from the cavity of the female mold. The result of this is that a certain amount of air pressure will be siphoned off the channel 100, and thus by increasing lowering back pressure P, the amount of air introduced within the sealed chamber 68 will be varied accordingly. It is to be noted that this constant back pressure P will aid in maintaining the outer marginal portion 18 of the container side wall in the formed position shown in FIG. 4 until a cut off is effected.

Figure 5:
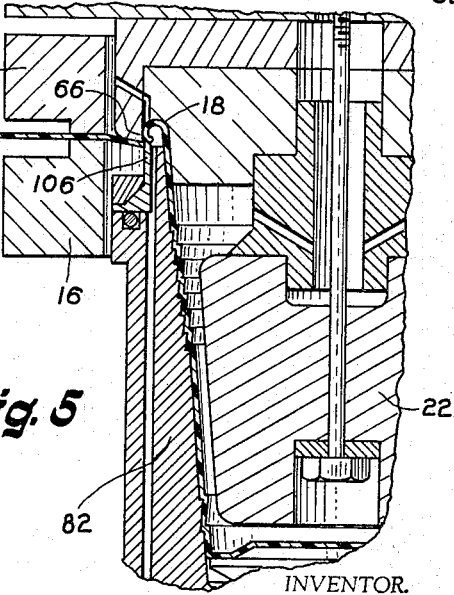
FIG. 5 is also a fragmentary sectional view of the apparatus, and in particular shows the severance of the container from the web of thermoplastic material.

The timing of the molding operation is quite important since air or other fluid pressure must be introduced through the adapter 30 for expanding the container against the inner periphery of the female mold, and for introducing an air pressure surge within the sealed chamber 68 before the cutting edge 66 and the cutting ring 106 cooperate to sever the container from the web. The severing phase of the molding cycle is depicted in FIG. 5 of the drawings wherein the cutting ring 106 and cutting edge 66 slide against one another to perform the desired action.

Thereafter, the continued relative movement of the mold means causes the cutting ring 106 to engage the severed free end of the container and curl or fold it back upon itself as indicated by the phantom lines in FIG. 6. The amount of curl or folding of the outer marginal portion 18 is determined by the degree to which the cutting ring 106 engages the upper marginal portion 18, and in most instances, the amount of curling shown in FIGS. 6 and 8 of the drawings will be sufficient.

The final step of the molding cycle comprises the separation of the upper and lower mold means and removal of the completed container identified 70 in FIGS. 7–8 of the drawings. The removal of the container is preferably accomplished by an air jet 120 directed against the side side wall thereof, the ejector or knock out plug 92 functioning to position the container 70 above the uppermost portion of the female mold so as to readily effectuate removal of the completed container.

The stacking and gripping areas of container 70 identified by numerals 72, 74 respectively, are formed, as previously discussed, by the circumferentially extending stepped portions 90, 88 of the female mold. The lip or rim area 76 of the container 70 is formed within substantially the same amount of time as would be necessary for the formation of the container alone by prior art apparatus, and without subsequent handling and rim rolling operations so as to minimize the cost and time required to form each container unit.

Another embodiment of the present invention is shown in FIGS. 9–11, and is generally similar to the previous embodiment as indicated by the application of identical reference numerals with the suffix a employed to designate like parts. The essential difference between this embodiment and the one previously described is the fact that a vacuum, instead of a positive air pressure, is used to withdraw air from the sealed chamber and provide the desired rim configuration. Since the apparatus shown in the FIGS. 9–11 embodiment is generally similar to that previously described, only those steps in the cycle which show the formation of the outer marginal portion 18 and the subsequent curling thereof have been illustrated.

In FIG. 9 of the drawings, the upper and lower mold means 20a, 80a respectively, are shown just after the introduction of air pressure via the ports 60a of the adapter 30a for expanding the predetermined drawn areas 12′ of the material against the inner periphery of the female mold 82a. The bottom portion 98a of the female mold has a plurality of openings 99 provided therein for the exhaustion of air trapped between the predetermined drawn areas 12′ of the web and the internal periphery of the female mold.

As has previously been discussed, the pinch seals at points A and B are preferably established prior to the introduction of air pressure through the ports 60a of the adapter 30a so as to again form the sealed chamber area 68a. Substantially simultaneously with the establishment of this sealed chamber, a vacuum is created by any suitable means to withdraw or evacuate air from the chamber 68a through the exhaust port 64a. Thus, a differential air pressure is created in this embodiment by the use of a vacuum on one side of the material in the upper marginal portion of the container side wall for expanding the same against the recess 62a and provide the desired cross sectional lip or rim configuration.

Thereafter, the cutting edge 66a associated with the upper mold means and the cutting ring 106a which, in this embodiment, forms a continuation of the annular encircling member 107, cooperate to sever the container or article from the web. The continued movement of the cutting ring 106a will effect the ultimate rim configuration for the container as in the previous embodiment. The vacuum is preferably maintained until after the rim or lip of the container has been curled or folded back upon itself in order to provide a rim or lip with a good material definition.

In either of the embodiments discussed, it is important that the outer marginal portion 18 of the article be sealed from both the partially formed container and the web, and this is readily accomplished by providing a pinch seal at points A and B in order to obtain the sealed chamber. In this manner, the positive air pressure or vacuum will be directed only against the upper marginal portion 18 of the article or container, and will not result in any loss of pressure or vacuum. The definition of the rim or lip area established during the differential pressure phase of the molding operation will be maintained during the mechanical engaging phase and will, therefore, aid in providing an improved rim configuration over that heretofore obtainable by prior art devices.

From the foregoing, it will now be appreciated that the method and apparatus of the present invention readily accomplishes the formation of a hollow article, such as a container, with a thickened rim portion in a single operation, and thus improves both the forming techniques as well as the ultimate article configuration. In certain instances, it may be desirable to trim the article or container while it is in deforming position, and thereafter transport the article to a separate apparatus for curling the rim thereof. In such a case, it is obvious that a separate rim curling apparatus could accomplish the rim curling operation by the use of the mechanical engaging and fluid pressure techniques heretofore discussed.

Although specific embodiments have been shown and described, it is with full awareness that many modifications thereof are possible. The invention is not to be restricted except insofar as is necessitated by the prior art and by the spirit of the appended claims.

What is claimed is:

1. Apparatus for forming a rim on a thin-walled thermoplastic container, comprising a mold having a cavity, an upstanding annular projection surrounding an upper margin of the mold cavity, a die block having a mandrel disposed opposite to said mold cavity and being provided with an annular recess encircling said mandrel and aligned with said upstanding projection, means for clamping heated thermoplastic material intermediate of and in a circumferential manner outside the mandrel and mold periphery, means for relatively shifting said mold and mandrel toward each other to thereby draw predetermined areas of the material into the mold cavity and for positioning said annular projection and recess in cooperative relationship, the maximum dimension of said recess being less than said projection whereby to clamp an upper marginal portion of said predetermined drawn areas on substantially opposite sides of said annular projection to seal said article from the remainder of the web and enclose said upper marginal portion within a sealed chamber, means for establishing a positive fluid pressure across said drawn material to expand the same against the inner periphery of the mold and complete the formation of the container, channel means connecting ports formed in the female mold with said sealed chamber upon the expansion of said predetermined drawn areas against the inner periphery of the female mold, the air between said predetermined drawn areas and said female mold is forced through said ports and channel means into said sealed chamber to cause said outer marginal portion to assume a predetermined cross sectional configuration relative to said container axis, said die block adjacent said recess and said annular projection having complementary cutting edges for severing the container and its upper marginal portion from the remainder of the web, the continued movement of at least a portion of said annular projection engaging and curling the severed free end of said upper marginal portion to complete the ultimate rim configuration.

2. The apparatus as defined in claim 1 including control means connected to said channel means for regulating the amount of air forced into said chamber.

3. The apparatus as defined in claim 2 wherein said chamber includes a passageway on the opposite side of the material from said channel means for exhausting air from said chamber.

References Cited
UNITED STATES PATENTS

| | | | |
|---|---|---|---|
| 2,967,328 | 1/1961 | Shelby | 18—19 |
| 2,985,914 | 5/1961 | Miller | 18—19 |
| 3,060,507 | 10/1962 | Knowles | 18—19 |
| 3,173,174 | 3/1965 | Edwards | 264—294 |

ROBERT F. WHITE, *Primary Examiner.*

R. R. KUCIA, *Assistant Examiner.*